3,285,288
SAFETY SHUT-OFF VALVE
Donald W. Irwin and Philip L. Johnson, both of Marshalltown, Iowa, assignors to Fisher Governor Company, a corporation of Iowa
Filed May 5, 1964, Ser. No. 364,956
5 Claims. (Cl. 137—630.15)

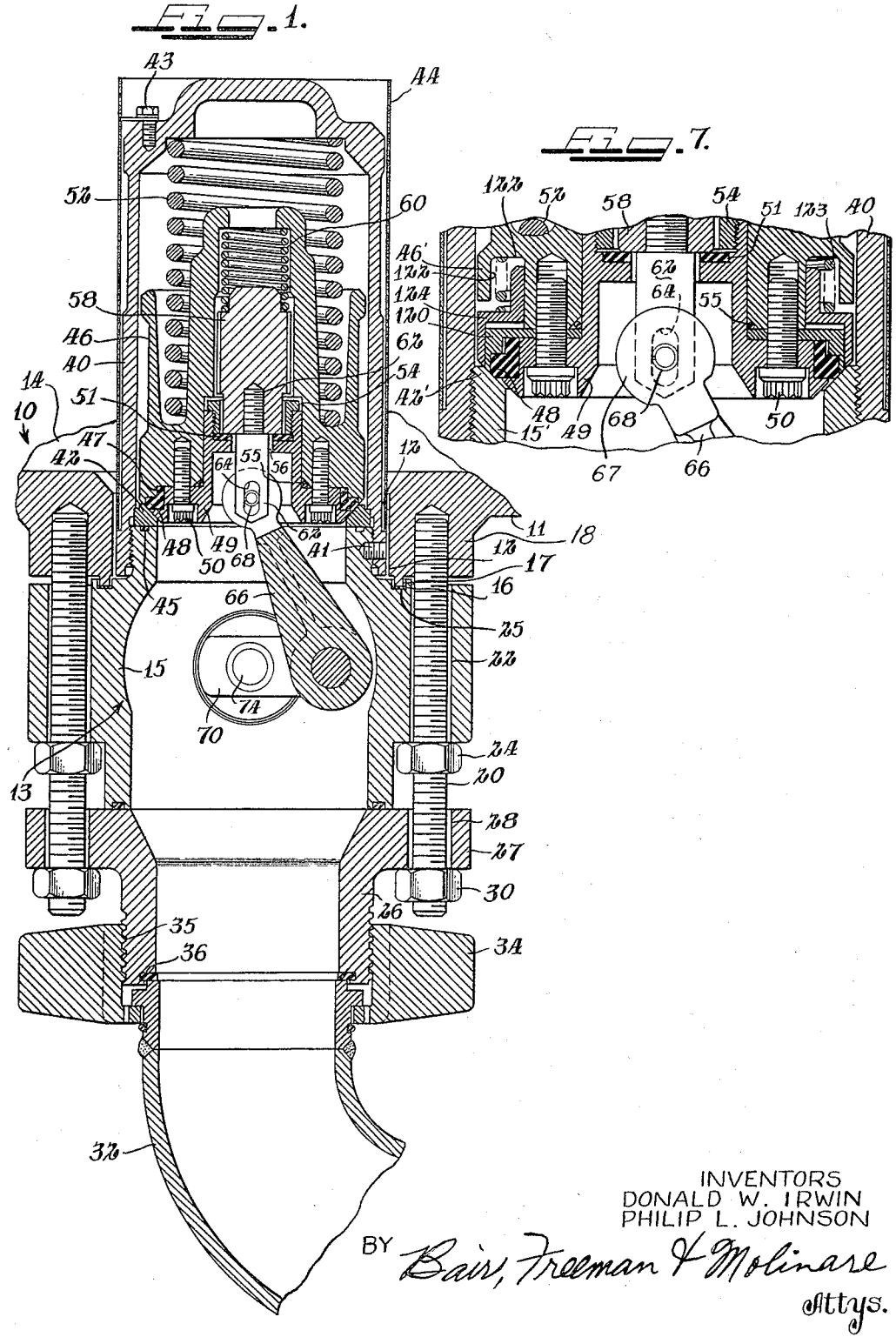

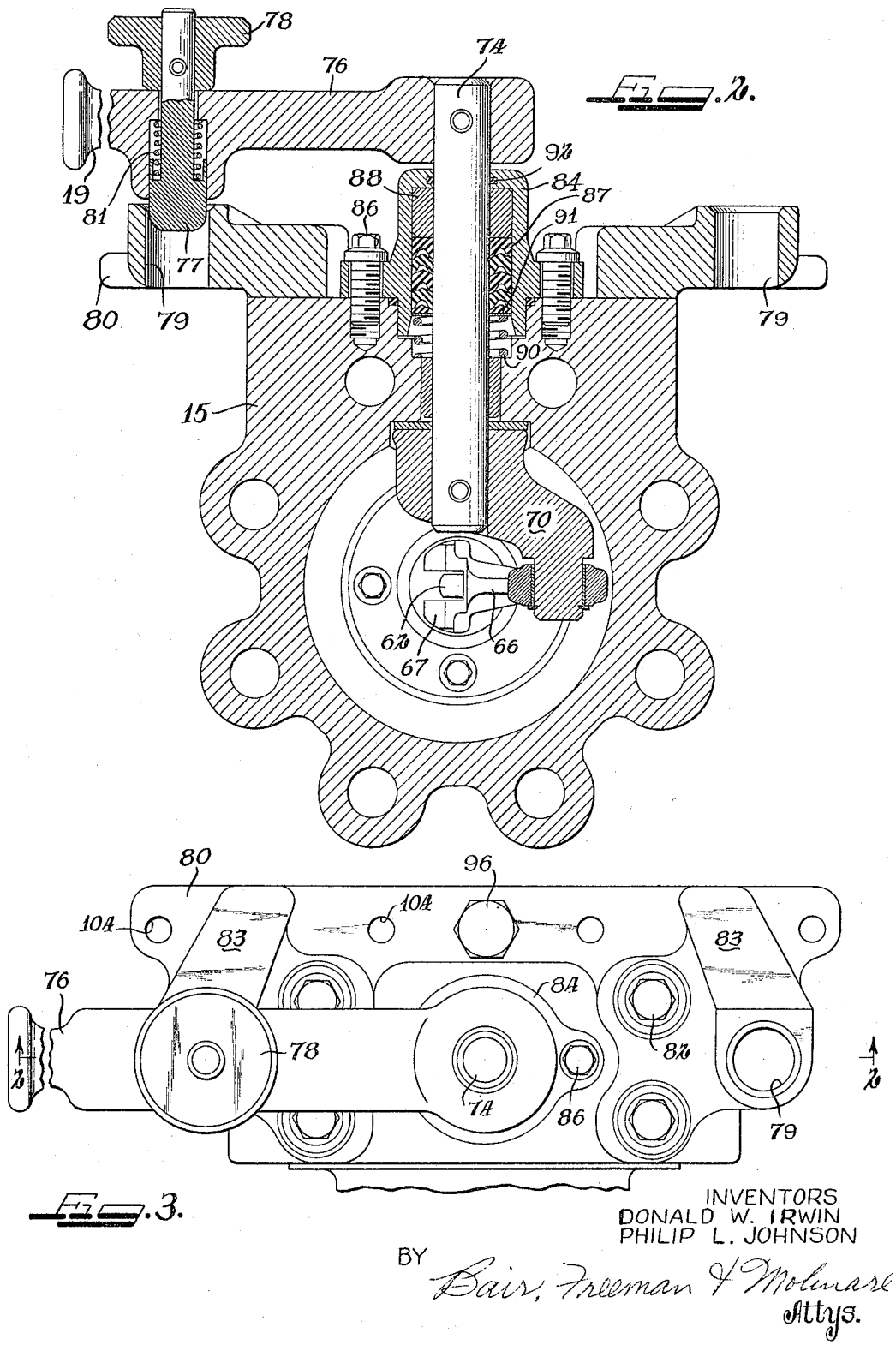

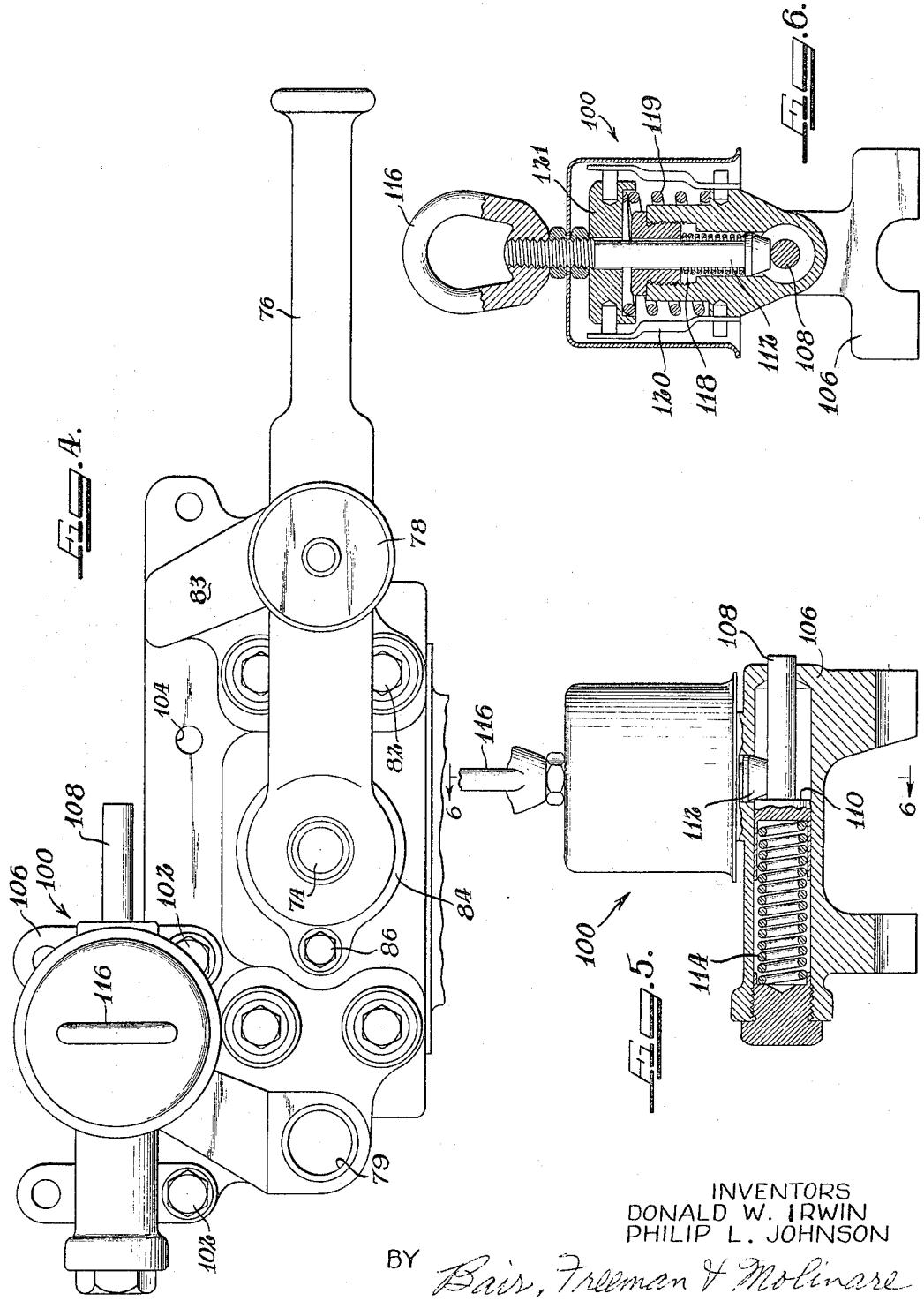

This invention relates to shut-off valves and, more particularly, to safety shut-off valves for use in liquefied petroleum gas or anhydrous ammonia storage containers and transport or delivery truck tanks.

In recent years, there has been a marked increase in the utilization of liquefied petroleum gas and anhydrous ammonia. The liquefied petroleum gas may be utilized for fuel in cooking and heating and anhydrous ammonia may be used as a fertilizer.

Ordinarily, these tanks are filled from the bottom due to the nature of the liquefied gas. It is desired that these tanks be filled as quickly as possible in order to reduce turn around time, for example, if the tank be a railroad tank car. Great care must be exercised during filling and emptying of the tanks due to the highly combustible nature of the liquefied gas. A desideratum of such valve construction is that the valve can be quickly closed in the event that an emergency situation arises, as for example, a line downstream of the container or tank developes a leak. Thus, safety and ease of use are two of the primary considerations in the design of shut-off valves for liquefied gas applications.

Heretofore, it has been suggested that automatic valves be provided which incorporate reverse flow check means to prevent the loss of liquefied gas from the tank in the event a break occurs in the line. Such valves, however, are of relatively low capacity and are not suitable for expeditiously filling large tanks on the order of 10,000 gallon capacity. On occasion, the use of such automatic valve incorporating a check valve has caused difficulty inasmuch as the check valve may close due to surges in fluid flow, thus adversely affecting the filling or unloading operation.

An object of the present invention is to provide a high capacity safety shut-off valve for liquefied petroleum gas or anhydrous ammonia service on transport trucks, tank cars, and large storage containers which extends into the fluid-containing tank and which has crank arm actuating means for actuating the main valve as well as an integral self-equalizing pilot valve within the valve body.

Another object of this invention is to provide a high capacity safety shut-off valve having crank arm actuating means and incorporating a main valve return spring, whereby when the crank arm is released, the main valve will be urged to closed position by its return spring.

A further object of this invention is to provide a safety shut-off valve with remote release mechanism to permit closure of the main valve from a place remote from the valve itself, such remote release mechanism being constructed and arranged to permit the crank arm to be moved overcenter for opening the main valve and being adapted to return the crank arm overcenter to permit closing of the main valve.

Yet another object of this invention is to provide a safety-shut-off valve having a crank arm actuating means with a novel remote release assembly for permitting closure of the main valve from a place remote from the main valve, the remote release mechanism being provided with fuse links to allow the main valve to be closed in the event of fire or other emergency. Other objects of the invention will be readily perceived from the following description.

The attached drawing illustrates a preferred embodiment of the invention, in which like numerals refer to like elements, and in which:

FIGURE 1 is a longitudinal cross-sectional view of the safety shut-off valve installed in a storage tank, with only a small portion of the storage tank being shown;

FIGURE 2 is a sectional view of the safety shut-off valve taken generally on the line 2—2 of FIGURE 3;

FIGURE 3 is a side view of the safety shut-off valve of the present invention;

FIGURE 4 is a side view of the safety shut-off valve and illustrating a remote control assembly in position on the safety shut-off valve;

FIGURE 5 is a side view of the remote control assembly shown in FIGURE 4 with parts being broken away for clarity;

FIGURE 6 is a cross-sectional view of the remote control assembly taken generally on the line 6—6 of FIGURE 5; and FIGURE 7 is a detail view of a modified main valve construction which can be utilized with the safety shut-off valve of the present invention.

Referring now to FIGURE 1, there is shown a liquefied petroleum or anhydrous ammonia storage tank 10 having a bottom wall 11 provided with an opening 12 within which the safety shut-off valve device indicated generally by the reference numeral 13 can be mounted in the bottom of the tank. The top portion of the safety shut-off valve device extends into the interior chamber 14 of the tank. By affixing the shut-off valve device 13 in tank 10 in such manner that the working parts are operable inside the tank, the likelihood of mishap and dangerous leakage of the liquefied gas to atmosphere is minimized.

The valve body 15 may be provided with an annular recess 16 in the top surface thereof which cooperates with an annular projection 17 on the flange member 18 on the bottom of the tank for aligning the valve within the opening 12 and facilitating attachment of the safety shut-off valve device 13 in the opening 12 in tank 10. A plurality of studs 20 extend from the annular flange 18 on the bottom of the tank. The studs 20 extend through cooperating openings 22 in the valve body 15 and the valve body is affixed in position by means of the nuts 24 which are turned down to hold the valve body securely in position on the annular projection 17. If desired, a sealing gasket 25 may be provided in the annular groove 16 defined in the valve body 15.

A fill connection 26 provided with a flange 27 having a plurality of openings 28 therein is positioned over the ends of the studs 20 and connected to the valve body by means of the nuts 30 which are tightened down upon the ends of the studs 20. An elbow 32 may be affixed to the bottom of the fill connection by a lock nut 34, which threadedly engages with the threaded exterior surface 35 on the fill connection. A suitable seal 36 may be provided between abutting surfaces of the fill connection 26 and the elbow 32. If desired, the fill connection 26 and elbow 32 may be removed and a flanged pump may be connected directly to valve body 15.

The safety shut-off valve device includes a valve body 15 having threadedly affixed thereto a tubular cage or guide cylinder member 40. A set screw 41 is provided to retain the member 40 in position upon the valve body 15.

Secured between a shoulder on the annular sleeve 40 and the top of the valve body 15 is a valve seat 42. Coaxially disposed about the cage member 40 and affixed thereto by suitable fastening means 43 is a strainer screen 44, preferably made from stainless steel.

It is to be noted that an O-ring 45 is provided in a recess between the valve body 15 and the valve seat 42 to prevent leakage there between.

Reciprocatingly disposed within the cage member 40 is a valve plug 46 having at its lower end a stepped shoulder 47 which is adapted to receive a valve member or disc 48 preferably made from neoprene or rubber. The valve disc 48 is held in place by means including retainer 49 and fastening means 50, which preferably take the form of machine screws threadedly engaged in tapped openings in the valve plug 46. An O-ring 55 is provided between retainer 49 and valve plug 46 to prevent leakage between these members.

The valve disc 48 is biased toward closed position against the valve seat 42 by means of the main closing spring 52, which is disposed between a recess in the valve plug 46 and a shoulder at the top of the cylindrical member 40.

Reciprocatingly carried within the valve means defined by the valve plug 46, the valve disc 48 and the valve retaining means 49 and 50 is an equalizing pilot valve means.

Such equalizing valve means comprise a valve disc 51 seated in a recess in the retainer 49 and having an opening there-through which defines a portion of the flow passage through the valve. The valve disc 51 is held in place within the retainer 49 by means of a holding nut or seat retaining ring 54 which is threadedly engaged within a recess in retainer 49. The internal passageway 56 defined through the retainer 49 is closed when the upper disc retainer or bleed valve 58 is seated upon the valve disc 51. The upper disc retainer 58 is normally biased into position against the valve disc 51 by means of the equalizing spring means 60 which is disposed between the top of the upper disc retainer 58 and a shoulder within the valve plug 46. The disc retainer 58 has a plurality of longitudinally disposed grooves in the surface thereof to permit the flow of fluid about the retainer 58 when the equalizing valve defined on the bottom of retainer 58 is spaced from valve disc 51. Thus, the equalizing passage comprises an opening in the top of valve plug 46, the space between the retainer 58 and the interior of valve plug 46, and the openings in valve disc 51 and retainer 49.

The equalizing pilot valve and the main valve are actuated in a predetermined sequence by crank arm actuating means which include an actuating pin 62 threadedly engaged at one end with the upper disc retainer 58 and with the other end depending downwardly therefrom and having a slot 64 defined therein. Engaged in the slot 64 is a roll-pin 68 which is carried in the bifurcated end 67 of clevis bar 66. The other end of clevis bar 66 is connected with crank arm 70. The actuating pin 62 and the clevis bar 66 are operatively connected to one another by a lost motion connection defined between the roller pin 68 and the slot 64 in the actuating pin 62.

A dashpot or shock absorber is defined between the interior of cage 40 and the flange at the top of valve 46 for retarding the closure of valve element 48. Liquid enters cage 40 through openings in the side thereof disposed below the flange on plug 46 when the valve is closed.

It is preferred that the valve body 15, the cage 40, and the valve plug 46 be fabricated from a lightweight durable, and corrosion resistant material, for example a high strength aluminum.

Referring to FIGURE 2, it is seen that the clevis bar 66 is journaled on an end of the crank arm 70 with the crank arm 70 being connected fixedly at its opposite end to the actuating stem or stub shaft 74. At its upper end, the shaft 74 is affixed to the actuating lever 76. Movement of lever 76 will actuate the crank arm actuating mechanism to selectively open and close the main valve.

Initially, the actuating lever 76 is retained in position by means of a lever handle 78. Affixed to handle 78 is a plunger 77 which is biased into engagement with an opening 79 in the lever stop 80 by spring 81. The lever stop 80 comprises a base member which is affixed to the valve body 15 by means of suitable fastening means 82 (FIGURE 4), which preferably take the form of machine screws.

Spring-loaded packing means are provided to seal the stub shaft or stem 74. Such packing means are disposed within a seal housing 84 which is affixed to the valve body 15 by means of retaining means 86, preferably machine screws. The seal or packing comprises a plurality of annular rings 87 of Teflon or like polyhaloethylene material, which are biased against backing ring 88 by means of spring 90. The spring 90 bears directly upon packing washer 91 which is disposed adjacent the lowermost ring 87. The spring-loaded packing members 87 provide a better seal than O-rings as used in similar constructions, for propane or like gas leaking passed a seal chills the seal to approximately —44° F. Conventional O-ring seals lose their resiliency at this temperature and thus lose their ability to seal. Teflon, at this relatively low temperature, has good sealing properties. The spring 90 compensates for wear upon the packing.

A rod wiper 92 is contained in the seal housing 84 to protect the packing rings 87 and the stub shaft 74 from dirt and other foreign materials which might cause failure of the seal.

Rotation of the actuating lever 76 is limited by a lever stop pin 96 which is affixed to an opening in the lever stop 80. The lever stop pin 96 is positioned in such manner that the actuating lever 76 must be held against the stop pin, for the crankshaft cannot be moved to dead center position so as to maintain the valve 48 open. It will be noted in FIGURES 3 and 4 that a pair of openings 79 are provided in the lever stop 80 so as to permit mounting and operation of the lever 76 from either one side or the other of the safety shut-off valve device.

In use, the handle 78 is pulled out, compressing the spring 81 and disengaging the plunger portion 77 of the handle from opening 79 in lever stop 80. The lever 76 is then rotated, moving the crank arm 70 and the clevis bar 66 attached thereto so that the roller pin 68 contacts the end of the slot 64 in the actuating pin 62. Additional rotation of lever 76 moves the actuating pin 62 and the guide member 58 away from contact with the upper valve disc 51, opening the equalizing bleed passage defined partially by the opening 56. Thus, pressure equalization is permitted on both sides of the main valve 48, with relatively little effort required on the part of the operator to actuate the lever 76.

After the pressures have been equalized on the inlet and outlet sides of the main valve, it is only necessary to move the main valve against the bias of the main closing spring 52 to open the flow passage. Continued rotation of lever 76 causes the bifurcated end of clevis bar to engage the retainer 49 and displace the retainer 49 and valve plug 46, thereby compressing the main closing spring 52, and opening the main valve as the valve plug 46 and the attached parts are moved from engagement with the valve seat ring 42. The lever 76 is moved until it engages lever stop pin 96 and must be held in this position because the lever stop pin 96 is so positioned that it will not allow the crankshaft 70 to move the overcenter or remain in the dead center position.

In FIGURE 4, there is shown a modification of the present invention, wherein the safety shut-off valve device is provided with a remote control assembly. The remote release assembly 100 is adapted to be mounted on the lever stop 80 by means of the bolts 102 which are threadedly engaged in tapped holes 104 in lever stop 80. When utilizing the remote release assembly 100, the lever stop pin 96 is removed.

As seen in FIGURES 4, 5 and 6, the remote release assembly comprises a body 106 having a release rod 108 reciprocatingly and slidably mounted in a bore therein. The actuating lever 76 is adapted to contact the release rod 108 and move the rod inwardly into the body 106 until the shoulder 110 on the release rod is engaged by the lower end of trip rod 112. As the outwardly extending end portion of rod 108 is forced inwardly into body 106, the plunger spring 114 is compressed. Upon engagement of the trip rod 112 with the smaller diameter of release rod 108, the release rod 108 will be locked in its spring-loaded position.

The crankshaft 70 of the main valve will be overcenter and the main valve 48 will remain in an open position until the lever 76 is rotated manually a sufficient distance to move the crankshaft 70 back overcenter or until the eye nut 116 of the remote release assembly is moved by actuating a flexible cable or like actuator to compress the locking spring 118 and disengage the trip rod 112 from contact with the release rod 108, thereby allowing the force of the plunger spring 114 to move the release rod 108 against the actuating lever 76. The release rod 108 rotates the lever 76 enough to move the crankshaft 70 back overcenter. The closing spring 52 of the safety shut-off valve in combination with tank pressure will move the valve plug 46 and cause the seating of valve 48 upon its seat 42. At the same time, the closing force will cause the lever 76 to rotate to its closed position. The plunger portion 77 of the handle 78 will ride up the inclined surface 83 on lever stop 80 until the plunger portion is moved into the associated hole 79 in the lever stop by the force of the handle spring 81, thus locking the lever 76 in a closed position.

Preferably, the remote release assembly is provided with fusible links 120 to allow for release of release rod 108 in the event of fire. Upon failure of the fusible links 120, the release spring 119 will cause the spring seat 121 to be biased away from the valve body 106, thereby disengaging the trip rod 112 from contact with the release rod 108. The release rod 108 will be actuated by biasing spring 114 to move the lever 76 to its closed position in the manner aforenoted.

In FIGURE 7, there is illustrated a modification of the safety shut-off valve of the present invention which incorporates a spring-loaded protective sleeve for extending valve disc life under severe operating conditions. All of the main features of construction of the valve are the same as heretofore. In this embodiment of the invention, the valve disc 48 is fixedly connected to the valve plug 46' between a retainer 49 and a second annular retainer 120. Confined in a recess 122 provided in the exterior of the valve plug 46' is a protective sleeve-like member 124, which is slidably disposed in the recess 122, and which is biased downwardly into engagement with the valve seat 42' by spring 123. As shown, the valve seat 42' is formed integrally as a part of the valve body 15'.

By virtue of this construction, wherein the ring member 124 contacts the valve seat 42' for a moment after valve element 48 is unseated, the valve disc 48 is protected from high velocities and erosion from foreign particles when the valve is opened. Further, in normal opening and closing operation, the member 124 will be seated against the valve seat 42', thereby providing a metal shut-off before the main valve 48 opens and closes. This construction extends the life of the valve for the valve is protected from high velocities and erosion.

If the valve disc should fail in use, then there will be metal-to-metal sealing between the valve seat 42' and retainer 49, retainer 120, and ring member 124 and the flow passage will be closed. This is an added safety feature in the event of fire and destruction of valve disc 48.

The present invention provides an internal safety control valve of high capacity which is adapted for use as the primary shut-off valve on storage containers, delivery units, transport trucks, or railroad tank cars containing liquefied petroleum gas or anhydrous ammonia. The valve is especially adapted for use with tanks of high volume where a relatively high flow rate is required and therefore in circumstances where the valve must, of necessity, have high capacity. The safety shut-off valve incorporates a crankshaft actuating means which cooperates with an internal integral equalizing pressure pilot valve for permitting opening of the valve with relatively little effort. It has been found that the force needed to open the main valve is greater than can ordinarily be exerted by a standard lever without pressuring the downstream piping. The use of a crankshaft actuating means also permits quick closure of the valve in case of an emergency.

The internal equalizing bleed is very simple and is completely contained within the valve. The external piping which has been utilized on similar valves in the past is subject to damage and the restricting orifices provided therein may become plugged due to foreign material. These deficiencies in prior equalizing bleed arrangements are obviated by the present design.

The crank arm actuating means may be modified to provide for pneumatic or hydraulic actuation of the crank arm, as for example, by substituting for the lever 76, a connecting arm affixed to a suitable cylinder and piston mechanism.

The safety control valve of this invention is designed for use with a remote release assembly. The remote release assembly of this invention is adapted to cooperate with the safety shut-off valve having a crankshaft type of actuating means and is constructed and arranged for cooperation with such crankshaft actuating means to provide an effective remote release unit. It is preferred that the fusible links be provided in the remote release assembly to allow such assembly to function in case of fire due to a force of a release spring provided therein. A pneumatic or hydraulic operator may be substituted for the eye nut 116 and its associated actuating linkage to provide for automatic operation of the remote release mechanism.

The above disclosure has been given by way of illustration and not by way of limitation and it is desired to protect all embodiments of the herein disclosed inventive concept within the scope of the appended claims.

We claim:

1. A high capacity shut-off valve for a large volume liquefied gas tank comprising a valve body adapted to be affixed in an opening in said tank; a tubular valve cage affixed to said body and extending into said tank, there being a flow path formed in said valve body and valve cage communicating with the interior of said tank; means defining an annular main valve seat between said valve body and said valve cage; a valve plug reciprocably disposed in said valve cage and having a main valve element thereon for seating against said valve seat to terminate fluid flow through said flow path; spring means biasing said valve element into engagement with said valve seat; equalizing valve means carried in said valve plug, comprising means defining a bleed passage in said valve plug, a bleed valve for closing said bleed passage and resilient means biasing said bleed valve to the closed position; actuating means including a crank arm operatively connected to said equalizing valve means for opening the bleed valve prior to moving the main valve element from engagement with said valve seat to equalize pressures on both sides of the main valve element, and thereby permit opening of the main valve element against only the force of said spring means, thereby facilitating opening of the main valve element; a sleeve-like ring disposed about the valve plug in close proximity to said main valve element for protecting the main valve element from erosion in use, and means for biasing said sleeve-like ring toward said valve seat, whereby said sleeve-like ring will seal against said valve seat.

2. A high capacity quick-closing safety shut-off valve for a large volume fluid container wherein a relatively large pressure is imposed upon such safety shut-off valve, comprising a main valve body adapted to be affixed to the container and extending through an opening in said container, said valve body defining a flow passage to the interior of said container, a valve seat in said valve body, a reciprocable valve element movable in said valve body and cooperating with said valve seat to terminate flow through said flow passage, spring means for biasing the reciprocable valve means closed, bleed valve means comprising means defining a bleed passage in said reciprocable valve element, a bleed valve member for terminating flow through said bleed passage, and resilient means biasing said bleed valve member toward flow terminating position in said valve body, and crank arm actuating means including a clevis bar operatively connected to said bleed valve member by a lost motion connection for opening the bleed valve member upon initial movement of the crank arm actuating means and prior to opening the valve element to equalize pressures on both sides of the valve element, and whereby upon continued movement of the crank arm actuating means, the spring means are compressed and the valve element is opened, said lost motion connection including cooperating pin and slot means on the clevis bar and the bleed valve member.

3. A high capacity quick-closing safety shut-off valve as in claim 2, wherein stop means are provided on said valve body in the path of movement of said crank arm actuating means for preventing movement of said crank arm actuating means beyond the overcenter position, whereby upon release of the moving force on said crank arm actuating means, the valve element will be biased closed by the spring means.

4. In combination with a high capacity safety shut-off valve for liquefied gas containers comprising a main valve body adapted to be affixed to the container and extending through an opening in said container, said valve body defining a flow passage to the interior of said container, a valve seat in said valve body, a valve element movable in said valve body and cooperating with said valve seat to terminate flow through said flow passage, spring means for biasing the valve element closed, bleed valve means in said valve body, and crank arm actuating means operatively connected to said bleed valve means for opening the bleed valve means prior to opening the valve element to equalize pressures on both sides of the valve element, said crank arm actuating means including a crank arm movable overcenter, a remote release assembly comprising a housing affixed to said valve body, a release rod reciprocatingly carried in said housing and extending into the path of movement of said crank arm, means biasing said release rod outwardly from said housing, trip rod means for holding said release rod in retracted position against the force of said biasing means, and release means for actuating said trip rod means to release said release rod, thereby permitting said release rod to move said crank arm overcenter, whereby said valve element may be closed by said spring means.

5. The combination of claim 4, wherein said release means includes means biasing said trip rod means out of release rod engaging position and fuse links which are constructed and arranged to be severed in the event of a predetermined emergency condition to bias said trip rod means from release rod engaging position to free the release rod and move the crank arm overcenter, thereby allowing closure of the valve element.

References Cited by the Examiner
UNITED STATES PATENTS

| | | | |
|---|---|---|---|
| 2,557,378 | 6/1951 | Granberg | 137—630.14 |
| 3,078,875 | 2/1963 | Farrell | 137—630.15 |
| 3,102,555 | 9/1963 | Botkin | 137—630.15 |

WILLIAM F. O'DEA, *Primary Examiner.*

CLARENCE R. GORDON, *Examiner.*